UNITED STATES PATENT OFFICE.

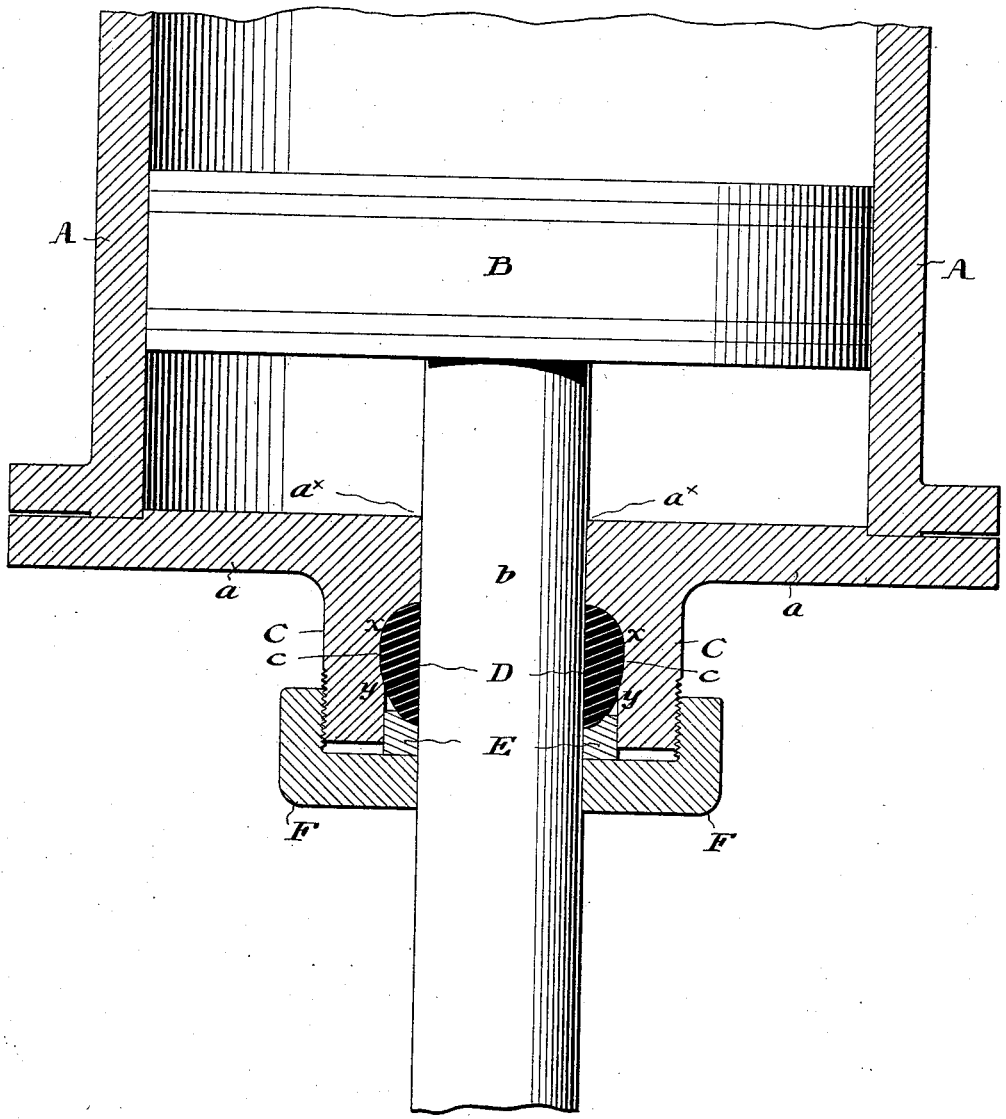

ERNEST ARMSTRONG, OF CAMDEN, NEW JERSEY, ASSIGNOR TO JOHN S. LATTA AND JAMES J. MULCONROY, OF PHILADELPHIA, PENNSYLVANIA.

STUFFING-BOX.

SPECIFICATION forming part of Letters Patent No. 606,754, dated July 5, 1898.

Application filed March 25, 1898. Serial No. 675,086. (No model.)

*To all whom it may concern:*

Be it known that I, ERNEST ARMSTRONG, a citizen of the United States, residing in the city of Camden, in the county of Camden and State of New Jersey, have invented certain new and useful Improvements in Stuffing-Boxes, of which the following is a specification.

My invention relates to stuffing boxes employed in connection with the piston rods of driver brakes, air and vacuum pumps, and similar devices, and its object is the provision of a packing of a simple, inexpensive, efficient, and durable, character.

In the accompanying drawing I show and herein I describe a good form of a convenient embodiment of my invention, the particular subject-matter claimed as novel being hereinafter definitely set forth.

In the accompanying drawing, which is a view in central, sectional, elevation, I illustrate my invention as employed in connection with an air or pneumatic piston rod of a well-known character.

In said drawing, A is the body, and $a$ the headplate, of a piston cylinder; B is a piston working in said cylinder; and $b$ a piston rod extending through an opening $a^\times$ in the cylinder head $a$.

C is the wall of a stuffing box, constituted by a boss erected upon and preferably integral with the body of the cylinder head, and concentrically disposed with respect to the piston rod. This stuffing box embodies a countersink $c$, concentric with the opening $a^\times$, and preferably undercut so as to be somewhat pear-shaped, so to speak,—the distance between the circumferential surface indicated by the points $x$—$x$ being slightly greater than the distance between the surface indicated by the points $y$—$y$.

D is a packing ring of rubber, the inner face or bore of which is cylindric and the exterior face of which is convex and approximately semi-cylindric. The longest circumference, or highest point, so to speak, of said convex surface, while in the vicinity of the central transverse plane of the ring, is preferably somewhat to one side thereof, to the end that the exterior of the ring may be adapted to fit accurately within the basal portion of the countersunk opening in the stuffing box.

The normal diameter of the bore of the packing ring D is considerably less than the diameter of the piston rod $b$ on which said ring is seated, and the exterior diameter of said ring is normally somewhat less than the diameter of the countersunk opening $c$ referred to, with the result that when said ring is threaded upon said piston rod it is considerably expanded so that it will not only hug the rod very tightly but also be so enlarged that its outer face will be forced into intimate contact with the inner face of the countersink $c$.

E is an annular gland of any preferred material, seated within the outer end of the countersunk stuffing box, the outer face of which is conveniently flat and its inner face conformed to approximately fit or conform to the end portion of the packing ring.

F is a cap adapted to be screwed upon the top of the stuffing box, and so proportioned and applied that when screwed home it will bear against the gland, with the result that the latter will bear against the packing ring and tend to shorten and further expand it against the wall of the countersink of the stuffing box.

Having thus described my invention, I claim—

In combination:—a piston rod or similar device,—a stuffing box through which said rod extends and which embodies an annular pear-shaped undercut recess of greater diameter than said rod,—a packing ring of rubber mounted on said rod, the interior diameter of which is normally less than the diameter of the rod and the exterior diameter of which is normally less than the diameter of said opening, so that when said ring is forced upon said rod it will be expanded against the inner face of said opening,—and means for maintaining said ring in position with the said stuffing box,—substantially as set forth.

In testimony that I claim the foregoing as my invention I have hereunto signed my name this 1st day of March, A. D. 1898.

ERNEST ARMSTRONG.

In presence of—
 WALTER C. PUSEY,
 F. NORMAN DIXON.